US012791088B2

(12) United States Patent
Omarov

(10) Patent No.: US 12,791,088 B2

(45) Date of Patent: Nov. 10, 2026

(54) HYDRODYNAMIC AUTOMATIC CONTINUOUSLY VARIABLE TRANSMISSION

(71) Applicant: Mikhail Magomedovich Omarov, selo Novo-Georgievka (RU)

(72) Inventor: Mikhail Magomedovich Omarov, selo Novo-Georgievka (RU)

( * ) Notice: Subject to any disclaimer, the term of this patent is extended or adjusted under 35 U.S.C. 154(b) by 22 days.

(21) Appl. No.: 18/852,267

(22) PCT Filed: Mar. 28, 2023

(86) PCT No.: PCT/RU2023/000091

§ 371 (c)(1),
(2) Date: May 6, 2025

(87) PCT Pub. No.: WO2023/191658

PCT Pub. Date: Oct. 5, 2023

(65) Prior Publication Data

US 2025/0277521 A1 Sep. 4, 2025

(30) Foreign Application Priority Data

Mar. 29, 2022 (RU) ........................... RU2022108237

(51) Int. Cl.
*F16H 41/24* (2006.01)

(52) U.S. Cl.
CPC .................................... *F16H 41/24* (2013.01)

(58) Field of Classification Search
CPC ... F16H 41/24; F16H 2041/243; B60K 31/12; F16D 33/14
See application file for complete search history.

(56) References Cited

U.S. PATENT DOCUMENTS 1,298,990 A * 4/1919 Mason .................... F16H 41/26 74/DIG. 3
10,563,738 B2 2/2020 Ikemura
(Continued)

FOREIGN PATENT DOCUMENTS

CN 215293489 U 12/2021
JP S5769164 A 4/1982
(Continued)

*Primary Examiner* — Terence Boes
(74) *Attorney, Agent, or Firm* — Maschoff Brennan

(57) ABSTRACT

The invention relates to hydrodynamic transmission. A continuously variable hydrodynamic automatic transmission contains an input shaft on which a central disk with radially directed grooves is rigidly fixed. Two mirror-like pump wheels are mounted on the input shaft on both sides of the central disk. Radially directed blades are fixed on the part adjacent to the hub and on the periphery of the pump wheels, and in the space between them there are rows of holes into which axes are inserted, rigidly attached to one of the ends of movable blades curved in a certain arc. The blades have the ability to rotate in these holes in a limited way. The ends of the blade axes have slots on which the blade legs are rigidly fixed perpendicular to the blade axis. The second ends of the blade axes have projections parallel to the blade axes. Two turbine wheels with radially directed blades rigidly fixed on them are closed by conical or toroidal annular discs. The housing is mounted on bearings on the drive shaft and in the crankcase of the flywheel of the drive device, and is connected to the reverse mechanism and the undercarriage of the vehicle. It achieves a reduction in weight and size characteristics, an increase in transmitted power, an increase in service life, a simplification of the design, an improvement in maintainability and operational properties of the automatic transmission of the vehicle.

1 Claim, 5 Drawing Sheets

(56) References Cited

U.S. PATENT DOCUMENTS

Figure 1:
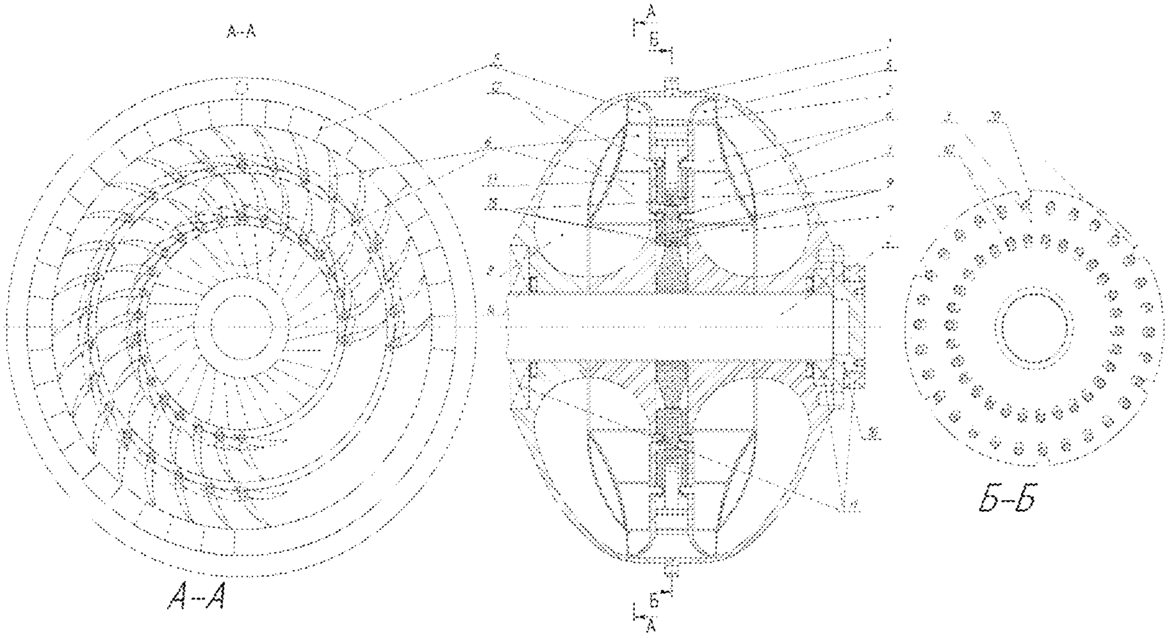

| | | | | |
|---|---|---|---|---|
| 10,760,661 | B2 | 9/2020 | Dumov | |
| 2017/0138455 | A1* | 5/2017 | Depraete | F16H 41/30 |
| 2022/0097521 | A1* | 3/2022 | Omarov | F16D 43/16 |

FOREIGN PATENT DOCUMENTS

| | | | |
|---|---|---|---|
| RU | 2341384 | C2 | 12/2008 |
| RU | 2481511 | | 5/2013 |
| RU | 2585093 | | 5/2016 |
| RU | 2659163 | C2 | 6/2018 |
| RU | 2700106 | C1 | 9/2019 |
| SU | 708092 | A1 | 1/1980 |
| SU | 1150426 | A1 | 4/1985 |

* cited by examiner

Movable blade control weight

HYDRODYNAMIC AUTOMATIC CONTINUOUSLY VARIABLE TRANSMISSION

The invention relates to the field of transport engineering and deals with the design of elements of a continuously variable transmission used in automatic transmissions of vehicles.

Known are automatic and hydromechanical transmissions, in which gear shifting is carried out by means of gears (RU 2341384, RU 2585093, RU 2659163, RU 2481511). The disadvantages of the known gearboxes are: their large weight and dimensions, the complexity of the design, containing a large number of gears and switching mechanisms, the complexity of maintenance and repair. In addition, the inclusion of a torque converter in the design of known automatic transmissions leads to an additional increase in the weight and size characteristics of the vehicle transmission.

Also known is a hydrodynamic automatic transmission, which is closest to the proposed one (RU 2700106), containing at least two pump wheels, which are round flat disks, on the front peripheral part of which firmly fixed are radially-directed blades, with the first wheel being rigidly connected to input shaft, the second and subsequent pump wheels, the diameter of each of which is greater than the diameter of the previous one, are mounted with their hubs set on the hubs of the previous pump wheels with the possibility of free rotation on them, but without the possibility of axial mutual movement so that a device is installed on the back side of each pump wheel for blocking it with the next pump wheel, and the last pump wheel—with the turbine wheel; on the front part of the second and subsequent pump wheels and on the turbine wheel installed are cylindrical rings with internal cogs for engagement with the blocking device; the blades of the turbine wheel on the side facing the blades of the pump wheels are closed with a cone-shaped annular disk, the larger diameter of which is equal to the diameter of the disk of the last pump wheel, and the smaller diameter is equal to the smaller diameter of the blades of the first pump wheel, with the turbine wheel being installed on bearings on the input shaft and in the crankcase of the drive unit and connected to the reverse mechanism, the device for changing modes and the running gear (chassis) of the vehicle.

The disadvantages of the mentioned box are: the presence of several pump wheels, which complicates the design of the box, the need for gear shifting, the complexity of tuning the automatic gear shift mechanism.

The objective of the proposed invention and the achieved technical result are: simplifying the design of an automatic transmission and improving the weight and size characteristics of the vehicle by reducing the number of pump wheels and complex mechanisms for locking them; improving gearbox performance and ride comfort by making the transition from low to high speeds smooth and vice versa.

To obtain this technical result, a continuously variable hydrodynamic automatic transmission (BGDAKP) is proposed, consisting of: an input shaft on which a central disk of a certain diameter is rigidly fixed with radially-directed grooves made along concentric circles located at certain distances from the center; two mirror identical pump wheels placed on the input shaft on both sides of the central disk with the possibility of limited rotation on it, but without the possibility of axial movement, having the shape of frying pans with hubs installed in their centers with flat bottoms facing the central disk. The diameters of the pump wheels are larger than the diameter of the central disk and they are rigidly fixed to each other across the space behind the central disk towards the periphery by axles on which L-shaped control weights of a certain mass are installed, the massive parts of which are directed counterclockwise, when viewed from the side of the input shaft, and have the ability, by limitedly rotating on them, to move from the central disk to the box body. Friction linings are installed on the sides of the control weights facing the box body. The second parts of the control weights, directed from the axes of rotation to the central disk, enter with their ends the outer grooves on the central disk. The return spring installed between the central disk and the pump wheels in a free state keeps the central disk in the extreme position turned counterclockwise relative to the pump wheels within its limits. On the concave peripheral parts and on the parts of the pump wheels adjacent to their hubs, rigidly fixed are radially-directed blades. In the spaces between the blades adjacent to the hubs and the peripheral blades of each pump wheel, made along concentric circles located at a certain distance from the center of the pump wheel, are holes into which the axles of movable blades bent along a certain arc are inserted, with the possibility of rotation in them. The ends of the axles of the blades protrude on the back side of the pump wheels and have slots on which the legs of the blades are rigidly fixed perpendicular to the axles of the blades, the second ends of the legs at a certain distance from the first ends have protrusions parallel to the axles of the blades inserted into the corresponding grooves on the central disk. On both sides of the pump wheels, set are two turbine wheels with radially-directed blades rigidly fixed on them, facing the blades of the pump wheels, which are simultaneously two halves of a collapsible box body. From the sides facing the pump wheels, the blades of the turbine wheel are closed by annular toroidal disks, the smaller diameter of which is equal to the diameter of the circle passing along the distant from the center ends of the blades rigidly fixed at the hubs of the pump wheels, and the larger diameter is by a certain amount less than the diameter of the circle passing along the distant from the center ends of rigidly fixed peripheral blades. The box housing is mounted on bearings on the drive shaft and in the crankcase of the flywheel of the drive unit and is filled with working fluid (oil) and connected to the reverse mechanism and chassis of the vehicle.

The essence of the invention is illustrated by drawings:

FIG. 1—General view of the continuously variable hydrodynamic automatic transmission, where:

1. Housing (turbine wheel)
2. Pump wheels
3. Central disc
4. Input shaft
5. Peripheral blades of pump wheels
6. Movable blades of pump wheels
7. Blades of pump wheels adjacent to the hub
8. Turbine wheel blades
9. Legs of movable blades
10. Grooves on the central disc
11. Bearings
12. Axles of movable blades
13. Toroidal ring discs
14. Oil seals
15. Protrusions of legs of blades
16. Output shaft
17. Control weights
18. Axles of control weights
19. L-shaped protrusion of the weight
20. External grooves of the central disc 21. Servo spring 22. Friction plate FIG. 2. Control weights.

Figure 3:
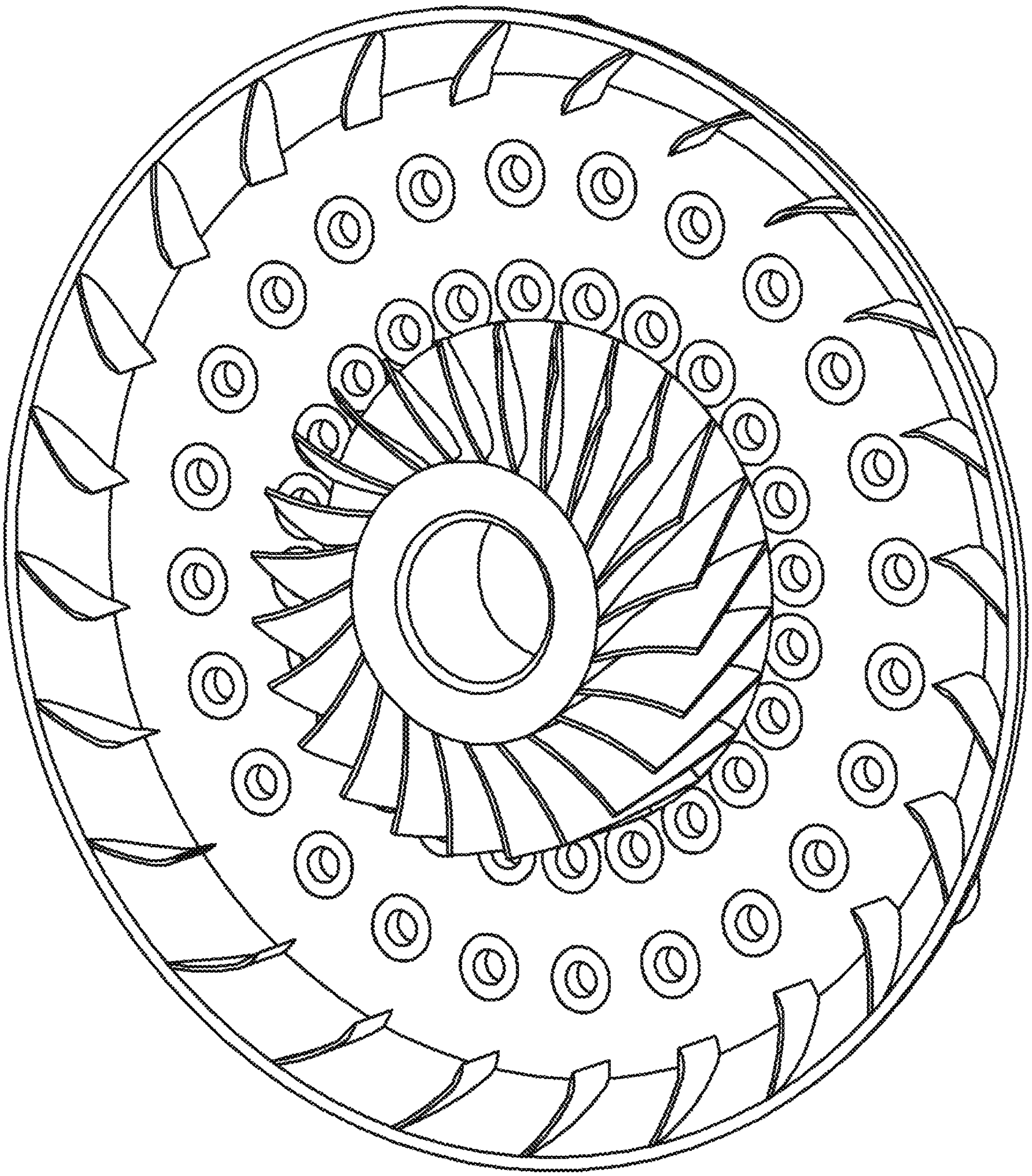

FIG. 3. Pump wheel.

Figure 4:
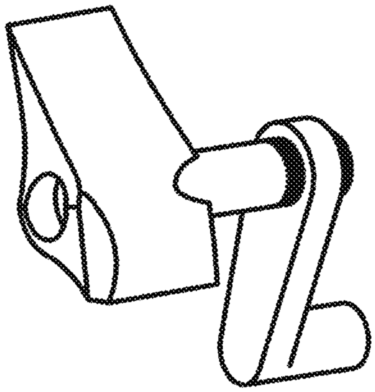
Figure 4:
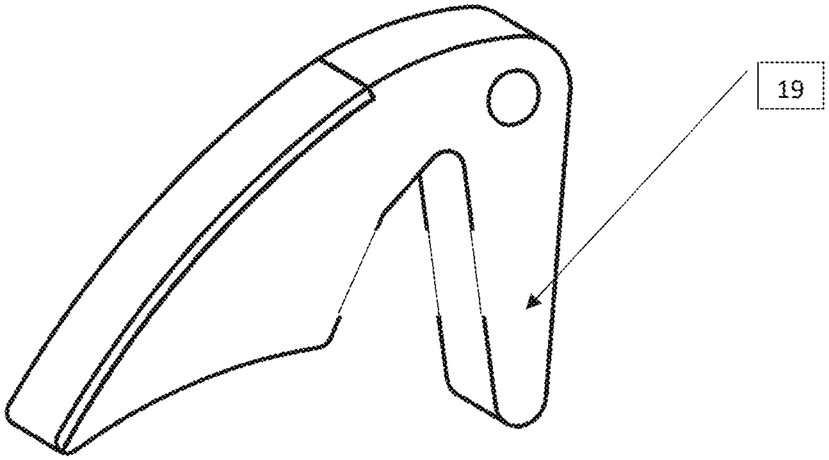

FIG. 4. Movable blade and control weight.

Figure 5:
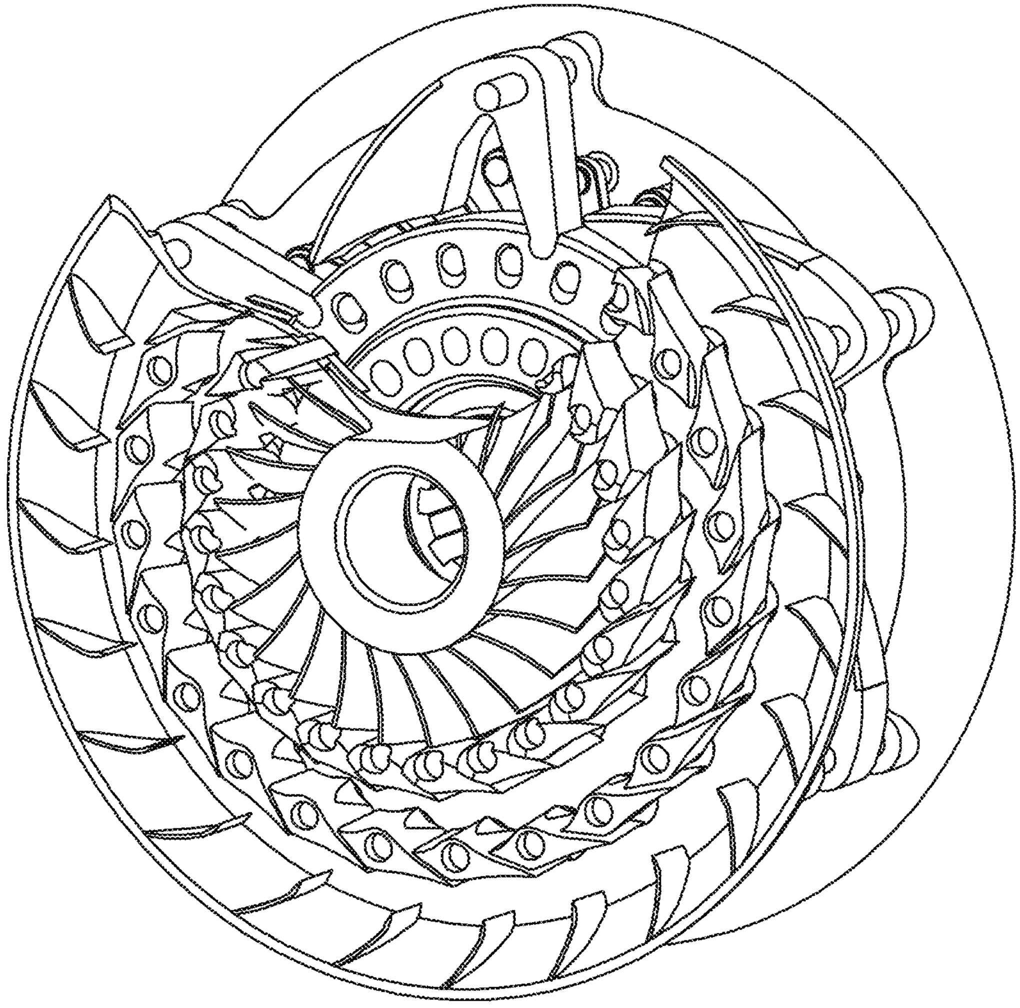

FIG. 5. Pump wheel with movable blades and control weights.

A continuously variable hydrodynamic automatic transmission operates as follows: at the initial moment, in the absence of torque on the input shaft 16, under the action of a return spring (not shown), the central disk 3 is in the extreme counterclockwise position (left) relative to the pump wheels 2, when viewed from the input shaft. With this position of the central disk relative to the pump wheels, legs 9 of movable blades 6, protrusions 15 of which are located in grooves 10 of central disk 3, translate movable blades 6 into a radially-directed state, as shown in FIG. 1 by the main (solid) lines. At the same time, the control weights will be in the topmost position (near the box body). When the rotation of input shaft 4 begins, a force will appear between the rigidly connected to it central disk 3 and pump wheels 2 due to the resistance of the working fluid to the rotation of the pump wheels and due to their inertia. The central disk, overcoming the resistance of the return spring, will move to the extreme (right) position clockwise relative to the pump wheels. Accordingly, the protrusions of the legs of movable blades 15, located in the grooves of central disk 3 and L-shaped protrusions 19 of control weights 17 will occupy the rightmost position, which will transfer the blades and control weights to the recumbent position, as shown in FIG. 1 with dotted lines. With this position of the movable blades, only the blades rigidly fixed near the hubs and on the periphery of the pumping wheels participate in the process of pumping the working fluid from the central part to the periphery and further to the turbine wheel, and the fluid flow created by them will be small. With an increase in the number of revolutions of input shaft 4, with central disk 3 rigidly fixed on it and pump wheels 2 rotating limitedly on it, control weights 17 under the action of centrifugal forces, overcoming the force from the input shaft transmitted to them through external grooves 20 on the central disk, will begin to move to the periphery, and their L-shaped protrusions 19 located in the outer grooves of central disk 20 will begin to return the central disk to its original position relative to pump wheels 2. In turn, central disk 3, in grooves 10 of which there are protrusions of the legs of movable blades 15, will begin to rotate legs 9 counterclockwise on their axles, which will cause the raising of the movable blades from a lying position. The raised movable blades (the changed angle of attack) will increase the flow of the pumped liquid, which will increase the force transmitted to the turbine wheel, i.e. to the output shaft, but at the same time the reverse force acting on the movable blades from the side of the pumped liquid will also increase, striving to lay them down. An increase in the load from the transmission side, with the value of torque on the input shaft being constant, will lead to an increase in the resistance to rotation of the pump wheels, the pressure force from the central disk on the protrusions of the legs of movable blades in the clockwise direction will increase, which will lead to a certain declining of the blades and a decrease in the load on the input shaft, which, in turn, allows to keep the numbers the revolutions of the input shaft and pump wheels close to the original ones. When the force from the input shaft is removed, with the vehicle moving on, the return spring and the centrifugal force of the rotating control weights and blades will transfer the central disk to its original (turned counterclockwise) position relative to the pump wheels, the blades will occupy an extreme, radially-directed position, the control weights will lock the pump and turbine wheels and the drive unit will start decelerating vehicle, similar to deceleration by engine when manual transmission is used. Thus, two forces counteract all the time: the first one is the cumulative force from input shaft and fluid pressure force, which tend to lay the movable blades and control weights down, and the second one is the centrifugal force acting on the control weights and blades, equal to the product of their total masses, the radii of their centers of mass and the square of the angular velocity of rotation of the pump wheels (F=mrω^2), striving to raise the movable blades. At the same time, the balance between the force applied from the drive shaft, the angle of rotation of the movable blades, the rotation speed of pump wheels, and, consequently, the rotation speed of output shaft corresponding to these parameters will be automatically adjusted and maintained.

Figure 2:
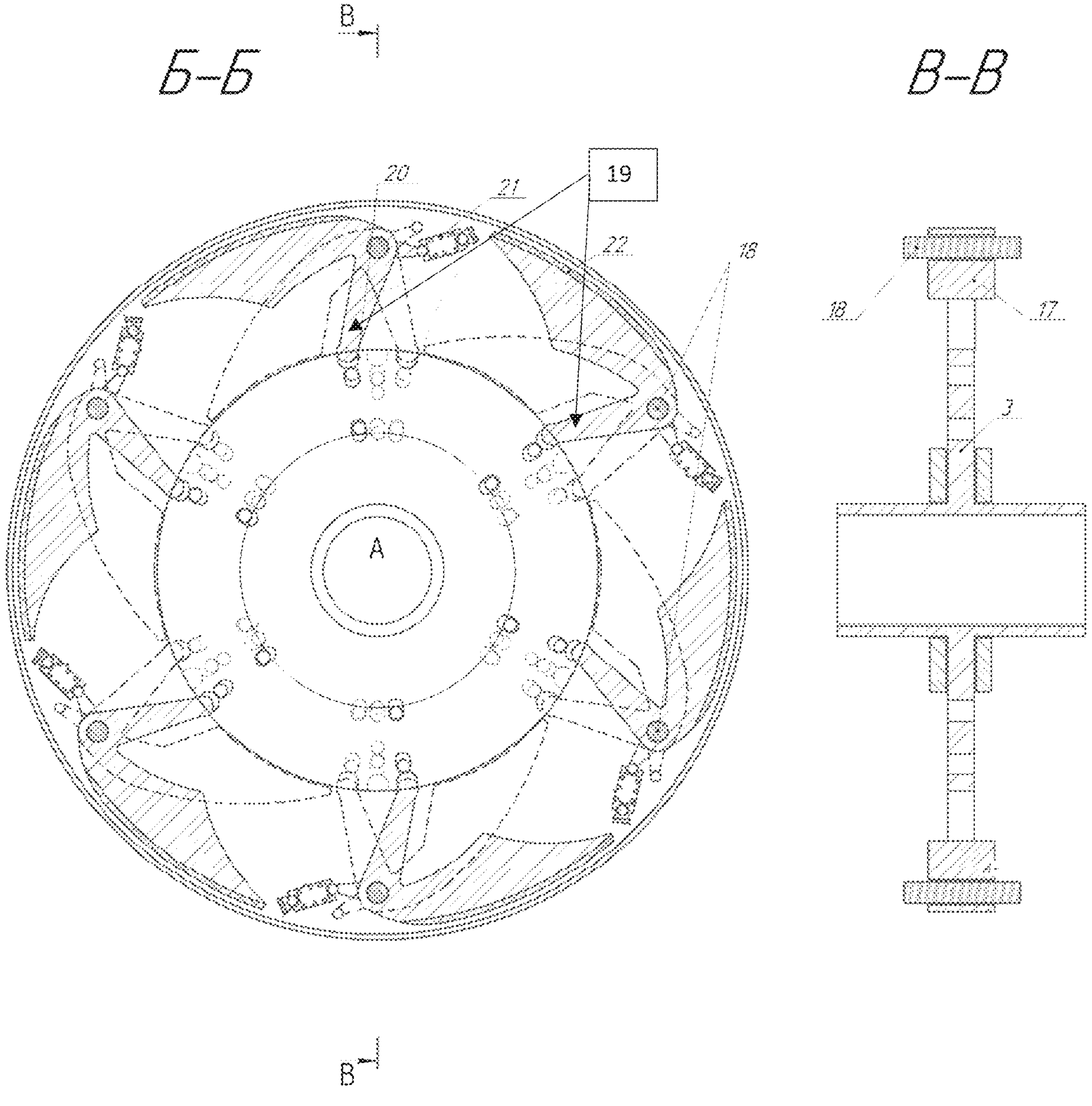

To block pumping wheels with the turbine wheel, when the specified rotation speed values are reached, used are servomechanisms consisting of springs, some ends of which are pivotally fixed to the pump wheels, and the other ones are pivotally fixed to special lugs of L-shaped weights, as shown in FIG. 2. Weights, dimensions and number of control weights, rigidity of the springs of servomechanisms are selected based on the size and class of the vehicle, the type of engine used. For example, for gasoline engines they are selected so that when 2200-2400 revolutions per minute are reached, the surface of the control weights covered with friction material reaches the inner surface of the ring mounted on one of the halves of the housing, and the servomechanism with force additional to the centrifugal forces growing in proportion to the increase in the radius of the centers of mass of the control weights and in proportion to the square of their angular velocity, locks the pumping wheels to gearbox housing, and moreover, a synchronizer and a gear locking device can be used on the control weights to exclude possible sliding. After locking the pump wheels with the gearbox housing, the entire gearbox rotates in the bearings as one solid body, sliding between the pump wheels and turbine wheels is eliminated, movement of working fluid inside the box stops.

To increase the transmitted power from the drive unit to the transmission, taking into account the small size of the box in the axial direction, without increasing the diametrical size of the mounting area, several such boxes can be installed sequentially on one drive shaft by connecting their housings to each other, or the diameter of the box can be increased.

Such an automatic transmission can be installed on various types of vehicles, including cars and trucks, agricultural machinery, marine and railway transport, on powerful inert installations with an electric drive to reduce the starting current, on motorcycles and other self-propelled vehicles.

The invention claimed is:

1. A continuously variable hydrodynamic automatic transmission (CVHAT) comprises:
   - an input shaft;
   - a central disk is rigidly fixed on the input shaft havingwith radially- directed grooves outer grooves formed along concentric circles located at distances from a center of the central disk;
   - two pump wheels disposed on the input shaft on opposite sides of the central disk, each pump wheel being rotatable relative to the input shaft within a limited range and axially fixed;

a plurality of radially-directed fixed blades is mounted on concave peripheral portions and around the hubs of the pump wheels; a plurality of holes formed in each pump wheel along concentric circles between the fixed blades near the hubs and the fixed blades on the concave peripheral portions;

a plurality of movable blades, each movable blade being curved along an arc and having an axle rotatably received in a corresponding hole, each axle extending to a rear side of the respective pump wheel and including a slot within the central disk;

a plurality of blade legs rigidly secured in the slots of the axles and extending perpendicular thereto, each blade leg including a protrusion engaged with a corresponding groove of the central disk such that movement of the central disk causes rotation of the movable blades;

a plurality of axles fixed between the pump wheels;

a plurality of control weights mounted on the axles for limited rotation, each control weight being L-shaped and including a first end engaged with the outer grooves of the central disk and a second end having a mass and extending counterclockwise relative to the input shaft, wherein the control weights are movable radially outward to displace the central disk relative to the pump wheels;

friction linings disposed on surfaces of the control weights facing a gearbox housing;

a return spring disposed between the central disk and the pump wheels and configured to bias the central disk toward an extreme counterclockwise position;

two turbine wheels disposed on opposite sides of the pump wheels, each turbine wheel including radially directed blades and forming a respective portion of the gearbox housing;

the gearbox housing being mounted on a drive shaft via bearings, enclosed within a crankcase, and containing a working fluid;

wherein, in an absence of torque on the input shaft, the return spring biases the central disk to the extreme counterclockwise position relative to the pump wheels such that the movable blades are positioned radially;

wherein, upon rotation of the input shaft, hydrodynamic resistance of the working fluid and inertia of the pump wheels cause relative displacement between the central disk and the pump wheels, thereby rotating the movable blades into a recumbent position such that primarily the fixed blades pump the working fluid from a central region to a peripheral region.

* * * * *